United States Patent [19]
Graff

[11] Patent Number: 5,678,447
[45] Date of Patent: Oct. 21, 1997

[54] ON-LINE WEB PLANARITY MEASUREMENT APPARATUS AND METHOD

[75] Inventor: Ernest A. Graff, Ontario, N.Y.

[73] Assignee: Eastman Kodak Company, Rochester, N.Y.

[21] Appl. No.: 633,602

[22] Filed: Apr. 17, 1996

[51] Int. Cl.$^6$ .................................................. G01L 5/04
[52] U.S. Cl. .................................... 73/159; 73/862.391
[58] Field of Search .......................... 73/159, 862.391, 73/862.41, 862.44, 862.55, 620, 627, 628, 629

[56] References Cited

U.S. PATENT DOCUMENTS

| | | |
|---|---|---|
| 3,459,019 | 8/1969 | Stone .................................. 73/159 X |
| 3,496,744 | 2/1970 | Mizuno et al. . |
| 3,499,306 | 3/1970 | Pearson . |
| 3,589,817 | 6/1971 | Sugaya . |
| 3,688,571 | 9/1972 | Atkins et al. . |
| 3,703,097 | 11/1972 | Kilpatrich et al. . |
| 3,850,024 | 11/1974 | Ando et al. . |
| 4,024,755 | 5/1977 | Queben . |
| 4,031,741 | 6/1977 | Schaming . |
| 4,116,029 | 9/1978 | Fabian et al. .................... 73/159 X |
| 4,255,055 | 3/1981 | Schave . |
| 4,289,005 | 9/1981 | Cabaret et al. . |
| 4,309,902 | 1/1982 | Sano et al. ........................ 73/159 |
| 4,574,634 | 3/1986 | Pappano .......................... 73/159 X |
| 4,643,230 | 2/1987 | Aemmer et al. . |
| 4,881,415 | 11/1989 | Hergeth ............................ 73/159 X |
| 4,924,086 | 5/1990 | Weber . |
| 4,977,685 | 12/1990 | Shahlapour . |
| 4,982,600 | 1/1991 | Kiso et al. ......................... 73/159 X |
| 4,984,458 | 1/1991 | Montgomery et al. ............. 73/159 |
| 5,025,665 | 6/1991 | Keyes, IV et al. ................. 73/159 X |
| 5,030,007 | 7/1991 | Calhoun et al. . |
| 5,066,865 | 11/1991 | Wennerberg . |
| 5,233,727 | 8/1993 | Baechler .......................... 73/159 X |
| 5,267,170 | 11/1993 | Anbe . |
| 5,398,538 | 3/1995 | Williams et al. ................... 73/159 X |
| 5,493,911 | 2/1996 | Hall et al. ......................... 73/159 X |

*Primary Examiner*—Elizabeth L. Dougherty
*Attorney, Agent, or Firm*—Susan L. Parulski

[57] ABSTRACT

A method and apparatus for determining the flatness of a sheet material, and for determining the lateral alignment stability of a web or sheet material. The method for determining the flatness of a sheet material includes subjecting a portion of the sheet material disposed between two rollers to a longitudinal tension insufficient to remove internal compressive strains in the longitudinal direction, sensing by non-contact means the distance from a reference plane to the sheet material, and determining a cross-sectional profile of the portion.

5 Claims, 6 Drawing Sheets

ON-LINE WEB PLANARITY MEASUREMENT APPARATUS AND METHOD

FIELD OF THE INVENTION

The invention relates to an apparatus and method for non-contacting sensing of the flatness or non-planarity of a moving web or sheet material. More particularly, the invention relates to an apparatus and method for measuring the flatness or non-planarity of a moving web or sheet material.

BACKGROUND OF THE INVENTION

Figure 1:
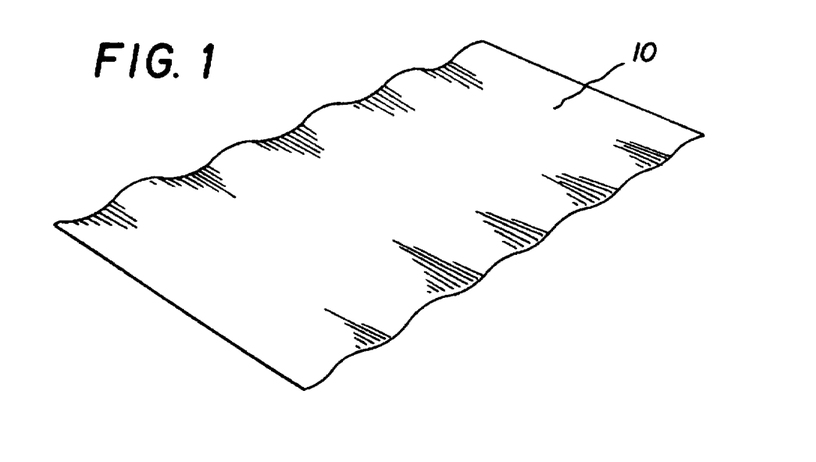
FIG. 1 shows exaggerated view of an unflat sheet material.

During the manufacturing of web or sheet material, differential tensions can form across the width of the web or sheet material, for example, from thermal or length variations. These differential tensions cause differential strains to exist in the web or sheet material, resulting in the web or sheet material exhibiting distortions or non-planarity when positioned on a flat surface. That is, the web or sheet material exhibits non-flatness characteristics such as wariness at the edges, ripples across the width. FIG. 1 shows an exaggerated view of an unflat sheet 10 exhibiting wariness at the edges.

Web unflatness or non-planarity is of particular concern when a second operation is conducted on the web. For example, in the manufacturing of photosensitive web material, such as film or paper, the web forms a base (hereinafter referred to as base web) onto which additional layers are coated. The base web, having been manufactured and wound onto a core, is unwound from the core and transported through a web transport apparatus. While transported through the apparatus, one or more photosensitive layers are coated on the base web to form the final product. The unflatness or non-planarity of the base web affects the lateral tracking of the base web through the web transport apparatus, thereby affecting the placement of the coated layers on the base web. If the base web is unflat or non-planar, the web will not laterally align during transport (lateral alignment referring to the average position of location of the web). Further, the unflatness of the base web may cause the web to weave or oscillate about a lateral position. It is preferred that the lateral alignment of the base web be stable during transport.

Visual inspection of the web material to determine unflatness is difficult. Various methods exist for measuring the flatness. One method is to lay a section of web on a flat surface or table, and then manually count the number of bumps or waves in a given length. Such a method is time-consuming and prone to errors.

U.S. Pat. No. 3,703,097 (Kilpatrich et al) relates to a method and system for measuring the flatness of a sheet material wherein the sheet material is placed in sufficient tension to remove substantially all internal compressive strains in the longitudinal direction, and measuring the surface profile of the sheet material transverse to the longitudinal direction by proximity sensing means. Applying such a level of tension to sensitized web material can adversely affect the photosensitive characteristics of the material. Further, Kilpatrich et al teaches a method wherein the web is placed in a horizontal web path for testing. Such a placement may not be feasible with existing web transport apparatus where space is limited.

Accordingly, a need continues to exist for a method and apparatus for determining lateral alignment stability and a method and apparatus for measuring the unflatness or non-planarity of a web or sheet material. Such a method and apparatus should be adaptable to existing web transport apparatus. For sensitized web material, the method should not adversely affect the photosensitive characteristics. Further, the method should provide a means of determining whether the web or sheet material is within a pre-determined specification or guidelines.

SUMMARY OF THE INVENTION

An object of the invention is to provide a method and apparatus for measuring the unflatness or non-planarity of a web or sheet material.

Another object of the invention is to provide such a method and apparatus which can be adaptable to existing web transport apparatus.

Still a further object of the invention is to provide such a method and apparatus wherein photosensitive characteristics of the web or sheet material are not adversely affected.

Yet another object of the invention is to provide such a method to determine whether the web or sheet material is within a pre-determined specification or guidelines.

Still another object of the invention is to provide a method for predicting or determining the lateral alignment stability of the web or sheet material.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for determining the flatness of a sheet material. The apparatus comprises a pair of rollers in spaced relation and rotatable about an axis; the axis of the rollers are substantially parallel. Transport means transports the sheet material along a first direction across the pair of rollers. Tensioning means subjects at least a portion of the sheet material disposed between the rollers to a longitudinal tension insufficient to remove internal compressive strains in the longitudinal direction. A plurality of non-contact sensors in a reference plane sense a distance from the reference plane to a plurality of points on the surface of the portion. A signal generator generates a plurality of signals representative of the distance sensed, and a processor manipulates the plurality of signals to determine a cross-sectional profile of the portion.

According to another aspect of the invention, there is provided a method for determining the flatness of a sheet material. The method includes transporting the sheet material along a first direction across a pair of rollers; subjecting at least a portion of the sheet material disposed between the rollers to a longitudinal tension insufficient to remove internal compressive strains in the longitudinal direction, the portion having a surface; sensing by non-contact sensors the distance from a reference plane spatially disposed from the sheet material to a plurality of points on the surface of the portion; generating a plurality of signals which are representative of the distance sensed; and determining a cross-sectional profile of the portion.

According to a further aspect of the invention, there is provided a method for determining lateral alignment stability of a web material. Such a method comprises transporting the web material along a first direction across a pair of rollers; subjecting at least a portion of the web material disposed between the rollers to a longitudinal tension insufficient to remove internal compressive strains in the longitudinal direction; sensing by non-contact sensors the distance from a reference plane spatially disposed from the web material to a plurality of points on the surface of the portion; generating a plurality of signals which are representative of the distanced sensed; determining a cross-sectional profile of the portion; providing a plurality of predetermined experimental data, the plurality of experimental data defining lateral alignment stability as a function of cross-sectional profiles; comparing the cross-sectional profile of the portion to the plurality of experimental data using regression analysis; and determining the lateral alignment stability of the portion.

The present invention provides an apparatus and method for measuring the flatness or non-planarity of a web or sheet material. The method and apparatus is adaptable to existing web transport apparatus. The method does not adversely affect the photosensitive characteristics of sensitized web or sheet material. Further, the method provides a means of predicting and determining whether the web or sheet material is within a pre-determined specification or guidelines. The present invention further provides a method for determining the lateral alignment stability of the web or sheet material

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Applicants have found that the cross-sectional profile of a moving sheet material or web material, as it is traversing between two rollers, provides an indication of the flatness of the material, web weave, and the lateral alignment of the material. Accordingly, the flatness of the material, web weave, and the lateral alignment can be correlated with the cross-sectional profile of the moving web.

Figure 2:
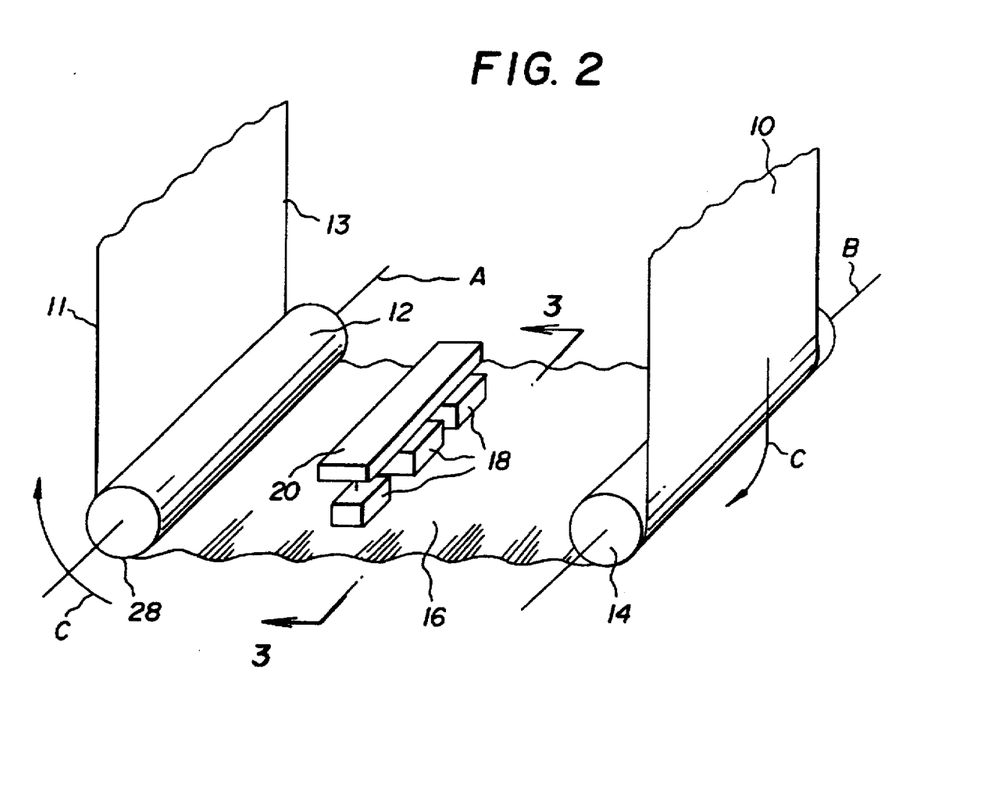
FIG. 2 shows a perspective view of an apparatus made in accordance with the present invention.
Figure 3:
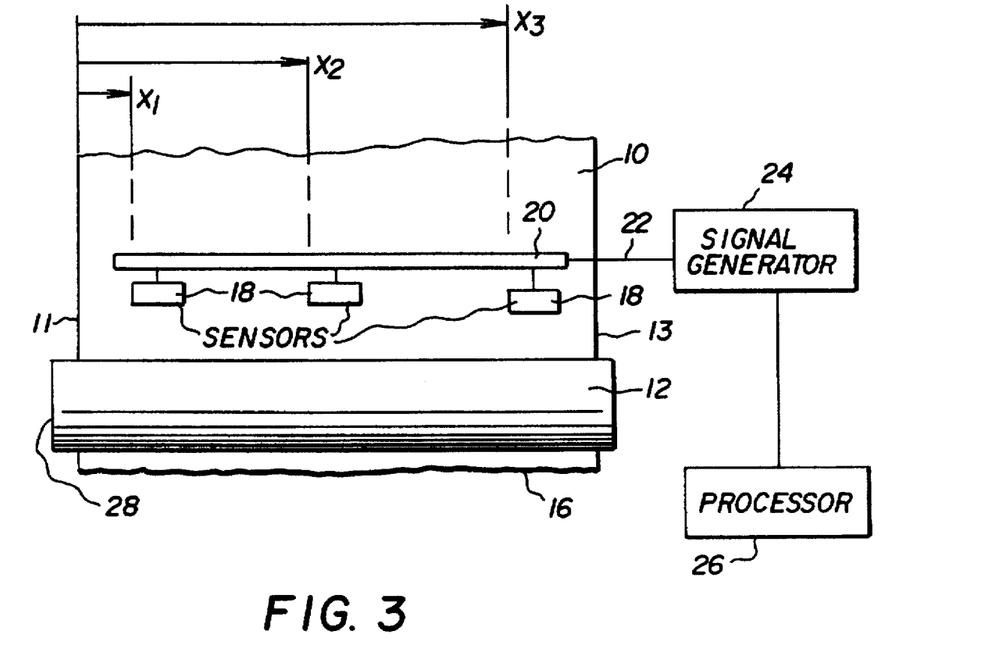
FIG. 3 shows a cross-sectional view of the apparatus of FIG. 2 as taken along line 3—3.
Figure 4:
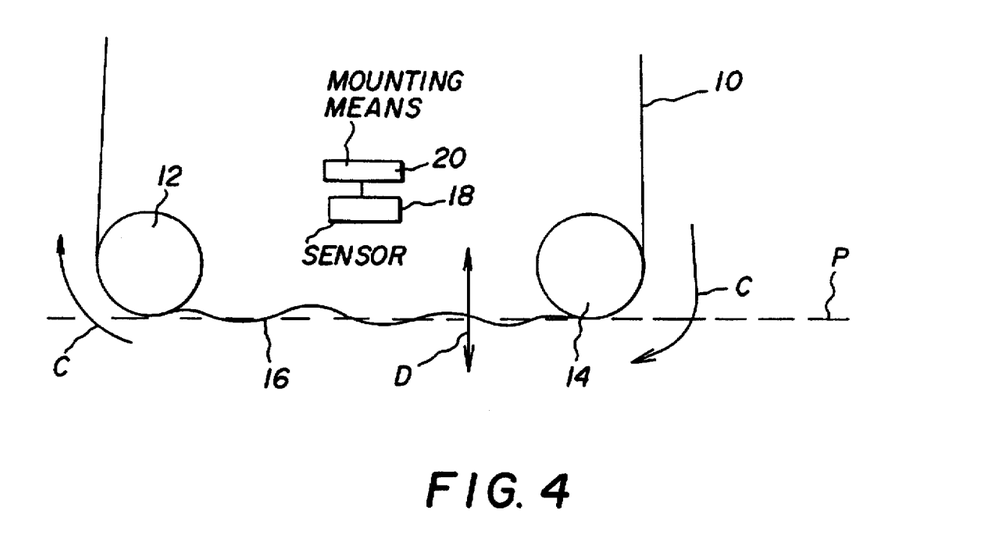
FIG. 4 shows a side elevational view of the apparatus of FIG. 2.

Referring to FIGS. 2 through 4, the apparatus of the present invention comprises a pair of rollers 12,14 in spaced relation. Rollers 12,14 rotate about axes A,B, respectively, that are substantially parallel. Web or sheet material 10 (hereinafter referred to as web 10) is transported in a direction, illustrated by arrow C, by a transport means (not shown) across rollers 12,14. Web 10 has a first edge 11 and a second edge 13. Rollers 12,14 can be positioned such that the segment of web 10 disposed between rollers 12, 14 is either horizontal or vertical with respect to a ground, or at any other angular orientation with respect to the ground.

The transport means subjects at least a portion 16 of the web disposed between rollers 12,14 to a longitudinal tension insufficient to remove internal compressive strains in the longitudinal direction. In a preferred embodiment, the tension of web 10 is 0.75 pounds per linear inch, dependent on the width of the web.

A plurality of non-contact proximity sensors 18 are spatially disposed from a surface of portion 16. A mounting means 20 may be provided to position sensors 18 relative to portion 16. Sensors 18 are arranged to define a reference plane, the reference plane being spatially disposed from portion 16. Sensors 18 sense a distance from the reference plane to a plurality of points on the surface of the portion. Communications means 22 connected sensors 18 with a signal generator 24 and a processor 26, such as a computer. Signal generator 24 generates a plurality of signals representative of the distance sensed by sensors 18, while processor 26 manipulates the plurality of signals to determine a cross-sectional profile of portion 16.

Preferably sensors 18 are ultrasonic sensors, such as PULSONIC non-contact measuring system from Cleveland Machine Controls which are adapted to measure displacement. Ultrasonic sensors are a suitable non-contact sensor since they have been noted to not adversely affect the photosensitive characteristics of a sensitized web. Generally in such an ultrasonic sensor, a pulse of high frequency sound is transmitted which reflects off portion 16 and transmits back to sensor 18. An electronic unit of the sensor generates a voltage signal proportional to the time required by the pulse to be transmitted back to the sensor. Accordingly, as portion 16 is displaced further from sensors 18, the time for the pulse to be transmitted back to sensor 18 will increase, as will the voltage signal generated.

In operation, for determining the flatness of web 10, web 10 is transported in direction C across rollers 12, 14. The longitudinal tension of portion 16 of web 10 disposed between rollers 12,14 is insufficient to remove internal compressive strains in the longitudinal direction. Sensors 18 are mounted to mounting means 20 so as to be positioned laterally across the width of portion 16 of web 10.

Figure 5A:
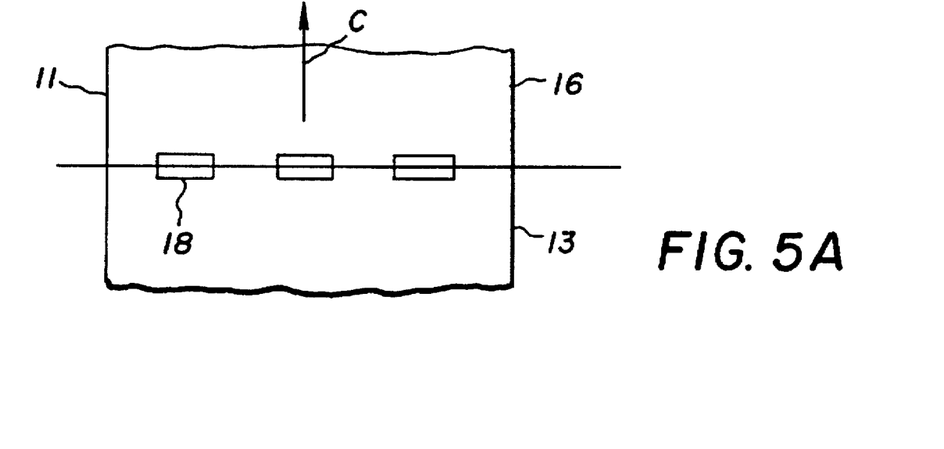
FIGS. 5A through 5C shows a partial top view of the apparatus of FIG. 2 illustrating the position of the sensors with respect to the web.
Figure 5B:
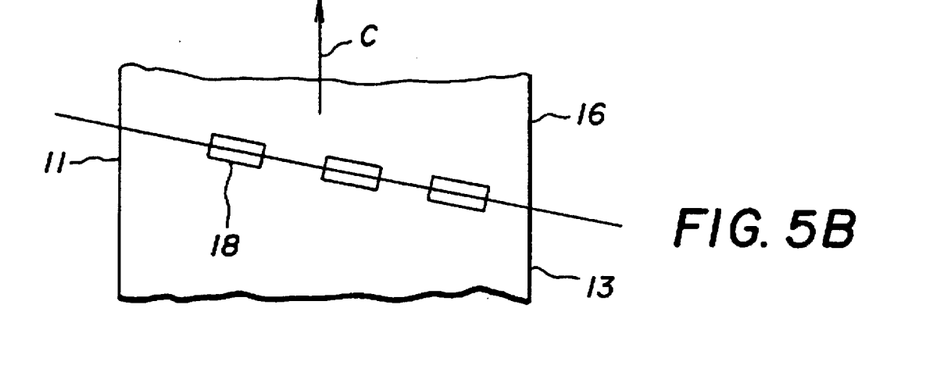
Figure 5C:
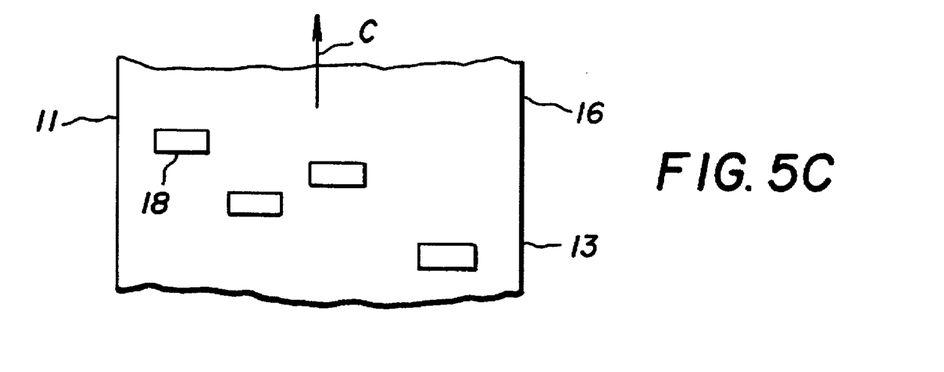

The plurality of sensors 18 can be arranged so as to be perpendicular to the direction C of travel of web 10 as illustrated in FIG. 5A. Alternately, sensors 18 can be arranged in a non-perpendicular orientation with the edges 11,13. Or, sensors 18 can be randomly arranged across the width of portion 16, as illustrated in FIG. 5C.

The position of each sensor 18 relative to a reference position (such as first edge 11 or second edge 13) is determined. For example, referring again to FIG. 3, the three sensors illustrated have a position $X_0$, $X_1$, and $X_3$ from edge 11. Alternatively, since edge 11 may weave, the position $X_0$, $X_1$, and $X_3$ of the three sensors may be referenced from a fixed location, rather than from edge 11. For example, from an end 28 of roller 12 as illustrated in FIGS. 2 and 3.

As web 10 is transported between rollers 12,14, web 10 will oscillate in a direction D perpendicular to the direction C of travel of portion 16, as illustrated in FIG. 4. Stated alternatively, web 10 oscillates in a direction perpendicular to a passline P, the passline being defined as a plane tangent to the surface of rollers 12,14. This oscillation is generally referred to as web flutter. As the web flutters, local internal tension variations (i.e., the unflatness characteristics) appear as a deviation from the passline. As these local variations move pass sensors 18, they will appear as flutter. Factors such as web material, web tension, web velocity, affect the amount of flutter.

Figure 6A:
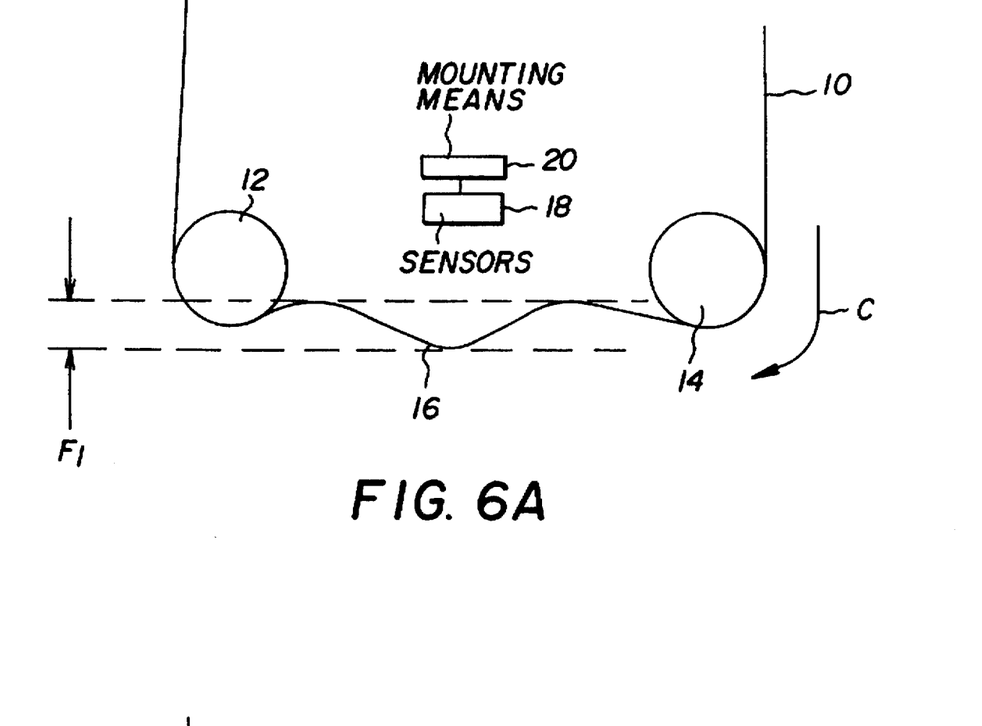
FIG. 6A and 6B show a side elevational view of the apparatus of FIG. 2 illustrating flutter of the web.
Figure 6B:
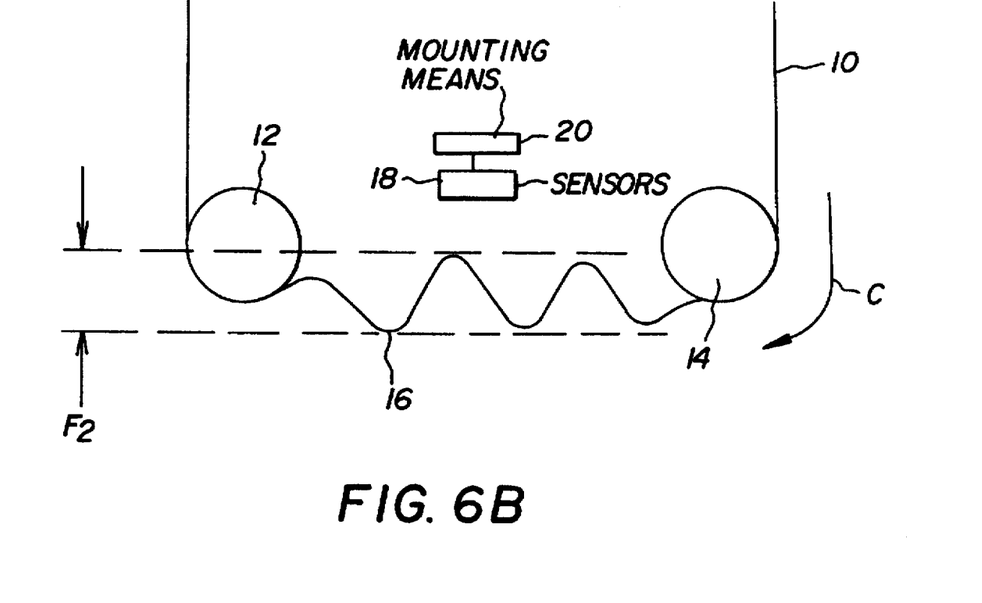

Referring to FIGS. 6A and 6B, if web 10 is substantially flat, web 10 flutters about passline P by an amplitude of flutter $F_1$, referred to as a baseline flutter. The amplitude $F_1$ being the average amplitude of the flutter over a predetermined time period. If web 10 includes non-flat characteristics, web 10 flutters about passline P by an amplitude of flutter $F_2$, which includes the baseline flutter. That is, the amount of flutter $F_2$ includes both the baseline flutter and the flutter resulting from the non-flat characteristics.

As the amount of flutter $F_2$ includes both the baseline flutter and the flutter resulting from the non-flat characteristics, web 10 tends to flutter more in the area of the non-flat characteristics (areas with low local tensions) than in the areas which are substantially flat (areas with higher local tensions).

Sensors 18 sense the distance from the sensors to a plurality of points on the surface of portion 16. This distance is sensed as a function of the position of the sensor (e.g., $X_0$, $X_1$, and $X_3$). Signal generator 24 generates a signal which is representative of the sensed data (i.e., distance as a function of the position of the sensor). The signals are collected by processor 26 wherein a corresponding cross-sectional profile of the portion is determined, thereby providing a determination of unflatness of the web.

Edge sensors (not shown) are positioned along the web to determine the lateral alignment of the edges of the portion of the web. Preferably the edge sensors are located adjacent the web at the location of sensors 18. Suitable edge sensors for this application are commercially available. The edge sensors provide data regarding the lateral orientation of the edges of the web corresponding with the distance information of sensors 18. With this information, a correlation can be made between the web weave, lateral alignment, and the cross-sectional profile.

EXAMPLE

Figure 7:
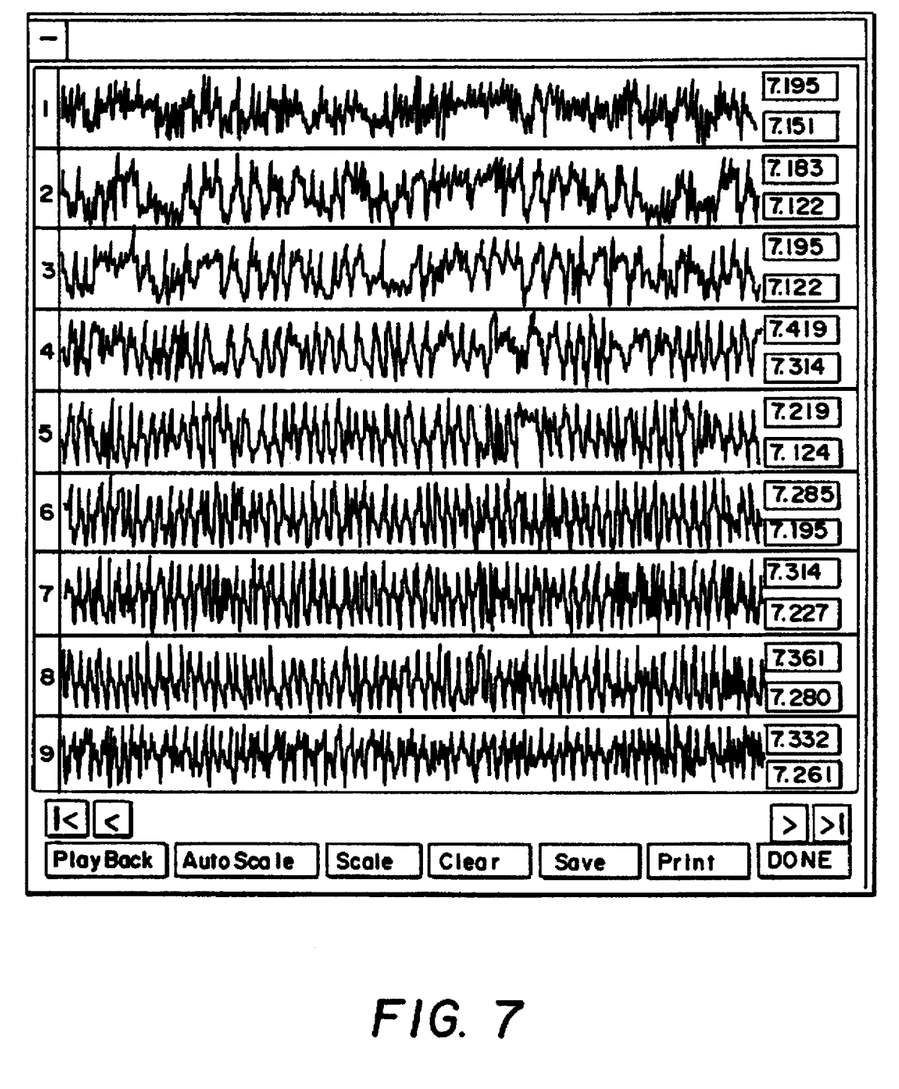
FIG. 7 shows a plot of the distance data for nine sensors.
Figure 8:
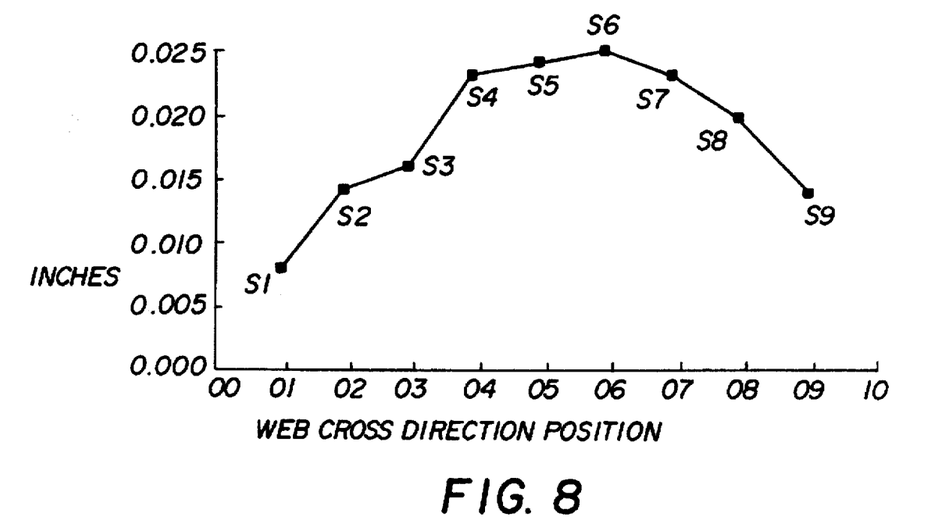
FIG. 8 shows a plot of the standard deviation for each of the nine sensors as a function of position.

An example of the operation is now provided using nine sensors 18, herein referred to as $S_1$ through $S_9$ as for ease of explanation. Sensors $S_1$ through $S_9$ are equally spaced across the width of web 10 at, respectively, positions $X_1$ through $X_9$. Sensors $S_1$ through $S_9$ provide a voltage output to signal generator 24, which determines a corresponding distance to portion 16. This information is sampled at 100 samples per second. This distance data is communicated to processor 26 which collects the data. A plot of the distance data for the nine sensors $S_1$ through $S_9$ for 10.24 seconds is shown in FIG. 7, thereby providing 1024 data points for each sensor $S_1$ through $S_9$. A standard deviation for the 1024 data points for each sensor $S_1$ through $S_9$ is calculated. (Note that preferably at least three data points are collected to calculate a standard deviation.) A plot of the standard deviations corresponding to FIG. 7 is shown in FIG. 8 as a function of position $X_1$ through $X_9$. As illustrated in FIG. 8, the horizontal axis is the position of the sensor relative to a reference edge (i.e., $X_1$ through $X_9$) and the vertical axis is the standard deviation (in inches). Accordingly, one point is plotted to correspond with the standard deviation for each of the nine sensors $S_1$ through $S_9$. FIG. 8 provides a cross-sectional profile of the web. As can be noted from the plot of FIG. 8, portion 16 flutters more in the center of the web (at position $X_5$ and $X_6$) than at the edges. Thus, the local tensions in the center of the web are less than at the edges. A difference is also noted between the flutter at sensor $S_1$ and sensor $S_9$, indicating a differential tension across the width of the web.

A best-fit curve is then fit to the plot of FIG. 8 using commercially available statistical packages, for example, applying the equation:

$$y=C_1+(C_2*x)+(C_3* x^2) \quad \text{Equation 1}$$

where $C_1$, $C_2$, and $C_3$ are the calculated coefficients of the best-fit curve, x is position of the sensor, and y is the standard deviation.

Figure 9:
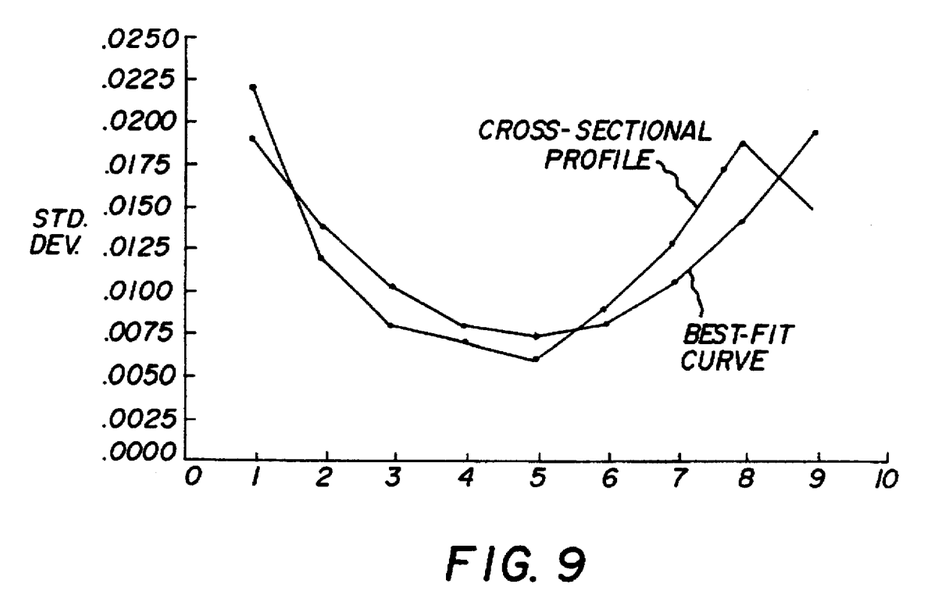
FIG. 9 shows a cross-sectional profile of a web and a corresponding best-fit curve.

FIG. 9 illustrates a cross sectional profile of web wherein portion 16 flutters more at the edges of the web than at the center. A corresponding best-fit curve is superimposed on the cross sectional profile.

The coefficients and the standard deviation data are stored in a data base. Also stored in the data base is data (taken by the edge sensors) relating to the lateral alignment corresponding to the cross-sectional profile. For example, as with sensors 18, the edge sensors are sampled at 100 samples per second, and the standard deviation for the data points are calculated. Other relevant information may be stored, for example, corresponding product information, machine speeds, or web tensions.

Repeating the data collection described above for different rolls of web produces multiple cross-sectional profiles with corresponding lateral stability alignment. This experimental data base allows an operator to predict lateral alignment stability for a particular roll. For example, once the three coefficients of the web are determined, the experimental database can be reviewed for a previous similar cross-sectional profile. Such a comparison can be conducted using regression analysis. Once a similar cross-sectional profile is located in the experimental database, the corresponding lateral alignment information will provide the operator with an understanding of the lateral alignment stability to be expected. With such information, the operator can pre-adjust the operating conditions accordingly to control the web during transport. Accordingly, given a cross-sectional profile of the web, a corresponding lateral alignment can be predicted.

Further, the coefficients obtained using Equation 1 can be compared to an acceptable range of coefficients corresponding to web weave that is within a pre-determined flatness specification. Such a comparison may be accomplished using regression analysis. If the coefficients are within the acceptable range, the web can be determined to be within the pre-determined lateral alignment specification. If the coefficients are outside the acceptable range, the web is determined to be outside the pre-determined lateral alignment specification.

The correlation between web weave and the cross-sectional profile can also assist in the manufacturing of a flat web. Understanding the level of weave that is desired, the web shape can be correlated with the web manufacturing process conditions.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

- 10 web or sheet material
- 11 first edge of web
- 12,14 rollers
- 13 second edge of web
- 16 portion of web disposed between rollers
- 18 sensors
- 20 mounting means
- 22 communication means
- 24 signal generator
- 26 processor
- 28 end of roller

What is claimed is:

1. A method for determining lateral alignment stability of a web material, comprising:

transporting the web material along a first direction across a pair of rollers, the rollers being in spaced relation and rotatable about an axis, the axis of the rollers being substantially parallel;

subjecting at least a portion of the web material disposed between the rollers to a longitudinal tension insufficient to remove internal compressive strains in the longitudinal direction, the portion having a surface;

sensing by non-contact sensors the distance from a reference plane spatially disposed from the web material to a plurality of points on the surface of the portion;

generating a plurality of signals which are representative of the distanced sensed;

determining a cross-sectional profile of the portion;

providing a plurality of predetermined experimental data, the plurality of experimental data defining lateral alignment stability as a function of cross-sectional profiles;

comparing the cross-sectional profile of the portion to the plurality of experimental data using regression analysis; and determining the lateral alignment stability of the portion.

2. The method according to claim 1 further comprising the step of determining whether the web material is within a predetermined lateral alignment stability specification.

3. A method for determining the flatness of a sheet material having a first edge, comprising:

transporting the sheet material along a first direction across a pair of rollers, the rollers being in spaced relation and rotatable about an axis, the axis of the rollers being substantially parallel;

subjecting at least a portion of the sheet material disposed between the rollers to a longitudinal tension insufficient to remove internal compressive strains in the longitudinal direction, the portion having a surface;

sensing by non-contact sensors the distance from a reference plane spatially disposed from the sheet material to a plurality of points on the surface of the portion;

generating a plurality of signals which are representative of the distance sensed; and determining a cross-sectional profile of the portion by calculating a standard deviation for each of the plurality of signals, and plotting the standard deviations as a function of the position of the sensor relative to the first edge.

4. The method according to claim 3 further comprising the steps of:

fitting a curve to the plot of standard deviation as a function of the position; and determining a set of coefficients which define the curve.

5. The method according to claim 3 further comprising the step of determining whether the cross-sectional profile of the sheet material is within a pre-determined flatness specification.

* * * * *